(12) United States Patent
Chen et al.

(10) Patent No.: US 7,825,998 B2
(45) Date of Patent: Nov. 2, 2010

(54) INPUT DISPLAY HAVING PARTICULAR PHOTO SENSOR, COLOR FILTER, AND LIGHT-SHIELDING ELEMENT ARRANGEMENT

(75) Inventors: Wei-Chou Chen, Hsinchu (TW); Po-Yang Chen, Taoyuan County (TW); Kei-Hsiung Yang, Taoyuan County (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 731 days.

(21) Appl. No.: 11/697,344

(22) Filed: Apr. 6, 2007

(65) Prior Publication Data
US 2008/0246905 A1 Oct. 9, 2008

(51) Int. Cl.
*G02F 1/1335* (2006.01)
*G02F 1/1333* (2006.01)
*G02F 1/1339* (2006.01)
*G06F 3/042* (2006.01)

(52) U.S. Cl. .................. 349/12; 349/106; 349/110; 349/155; 349/156; 345/173; 345/175

(58) Field of Classification Search .............. 349/12, 349/106, 110, 155, 156; 345/173, 175
See application file for complete search history.

(56) References Cited

U.S. PATENT DOCUMENTS

| | | | |
|---|---|---|---|
| 6,069,674 A * | 5/2000 | Aomori et al. | 349/12 |
| 6,501,529 B1 * | 12/2002 | Kurihara et al. | 349/160 |
| 6,657,699 B2 * | 12/2003 | Matsumoto | 349/156 |
| 6,671,025 B1 * | 12/2003 | Ikeda et al. | 349/156 |
| 2004/0113877 A1 * | 6/2004 | Abileah et al. | 345/92 |

* cited by examiner

*Primary Examiner*—Michael H Caley
(74) *Attorney, Agent, or Firm*—Thomas, Kayden, Horstemeyer & Risley

(57) ABSTRACT

Input displays are provided. A representative input display comprises a first substrate, a second substrate, a liquid crystal layer, a photo sensor, a color filter, and a light-shielding element. The liquid crystal layer accommodated in a liquid crystal space is sandwiched between transparent first and second substrates, comprising a first substrate side and a second substrate side. The photo sensor overlies the first substrate side. The color filter disposed in the liquid crystal space, over the photo sensor. The color filter comprises a first opening exposing portions of the photo sensor. The light-shielding element is disposed alongside portions of a periphery of the photo sensor.

20 Claims, 5 Drawing Sheets

INPUT DISPLAY HAVING PARTICULAR PHOTO SENSOR, COLOR FILTER, AND LIGHT-SHIELDING ELEMENT ARRANGEMENT

BACKGROUND OF THE INVENTION

1. Field of the Invention

The invention relates to input displays and more particularly to touch sensitive displays.

2. Description of the Related Art

With an input display, a user can select from displayed options by directly touching the desired option display. Common techniques employed in an input display for detecting the location of a touch include infrared light, surface acoustic waves, optical sensing, electromagnetic sensing, capacitance sensing and resistance sensing.

Input displays comprise a touch panel supported above a glass screen of the displays for detecting touch position, thus, cost is increased, and display transmittance is reduced by about 20%. Embedded input displays use the optical sensitivity of amorphous silicon to integrate a photo sensor into array processes of thin-film transistor liquid crystal displays (TFT-LCD); thus, cost is lower and optical performance is better.

The photo sensor receives ambient light and the backlight reflected by the internal cell elements of the input display. Ambient light is desirable, but reflected backlight is considered to be noise by the photo sensor. The signal-to-noise ratio becomes smaller as ambient light becomes weaker or the reflected backlight becomes stronger.

In FIG. 1, a conventional input display is shown. The input display comprises a liquid crystal layer 7 sandwiched between glass substrates 4 and 6. A photosensitive thin film transistor 5 is disposed on a surface of the glass substrate 4 opposite to glass substrate 6, and a black matrix 10 and a color filter 20 are disposed on a surface of the glass substrate 6 opposite the glass substrate 4. The opening 11 of the black matrix and the opening 21 of the color filter 20 expose the channel region of the photosensitive thin film transistor 5, thus, the photosensitive thin film transistor 5 can detect ambient light entering through openings 11 and 21.

Representative light beams 1 through 3 from the backlight (not shown) of the input display are shown in FIG. 1. Light beam 1 is reflected by the interface of the liquid crystal layer 7 and the color filter 20, Light beam 2 is reflected by the interface of the color filter 20 and the black matrix 10, and Light beam 3 is reflected by the interface of the color filter 20 and the glass substrate 6. Reflected light beams 1 through 3 are transmitted into the channel region of the photosensitive thin film transistor 5, and can also be detected by the photosensitive thin film transistor 5. When an operator touches the input display and blocks ambient light from entering openings 11 and 21, the photosensitive thin film transistor 5 detects "dark information" and transmits an input signal. At the same time, however, the light beams 1 through 3, are continuously reflected into the photosensitive thin film transistor 5. The photosensitive thin film transistor 5 may detect the reflected light beams; thus, the input signal is hidden by the reflected light beams, causing input failure. This error occurs more frequently when ambient light is weak.

BRIEF SUMMARY OF THE INVENTION

Input displays capable of preventing backlight reflection are provided.

An exemplary embodiment of an input display comprises a first substrate, a second substrate, a liquid crystal layer, a photo sensor, a color filter, and a light-shielding spacer. The liquid crystal layer is accommodated in a liquid crystal space between the transparent first and second substrates. The liquid crystal space comprises a first substrate side and a second substrate side. The photo sensor overlies the first substrate side. The color filter is disposed in the liquid crystal space and over the photo sensor. The color filter comprises a first opening exposing portions of the photo sensor. The light-shielding spacer, supporting the liquid crystal space, is disposed alongside portions of the periphery of the photo sensor.

Another exemplary embodiment of an input display comprises a first substrate, a second substrate, a liquid crystal space, a photosensitive thin film transistor, a first color filter, and a light-shielding block. The liquid crystal display is accommodated in a liquid crystal space between the first and second transparent substrates. The liquid crystal space comprises a first substrate side and a second substrate side. The photosensitive thin film transistor comprises a gate electrode, a source electrode, a drain electrode, and a channel region. The photosensitive thin film transistor overlies the first substrate side. The first color filter is disposed in the liquid crystal space and over the photo sensor. The first color filter comprises a first opening exposing at least the channel region. The light-shielding block is disposed in the liquid crystal space, alongside portions of the photosensitive thin film transistor, leaving the channel region exposed.

Further scope of the applicability of the invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
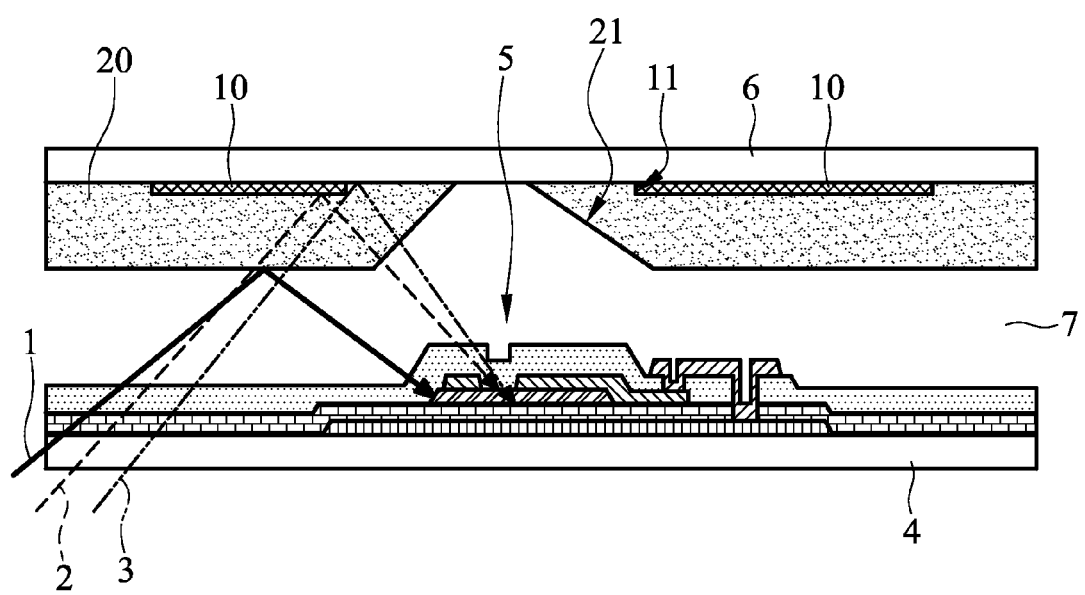
FIG. 1 is a cross-section of a conventional input display.
Figure 2A:
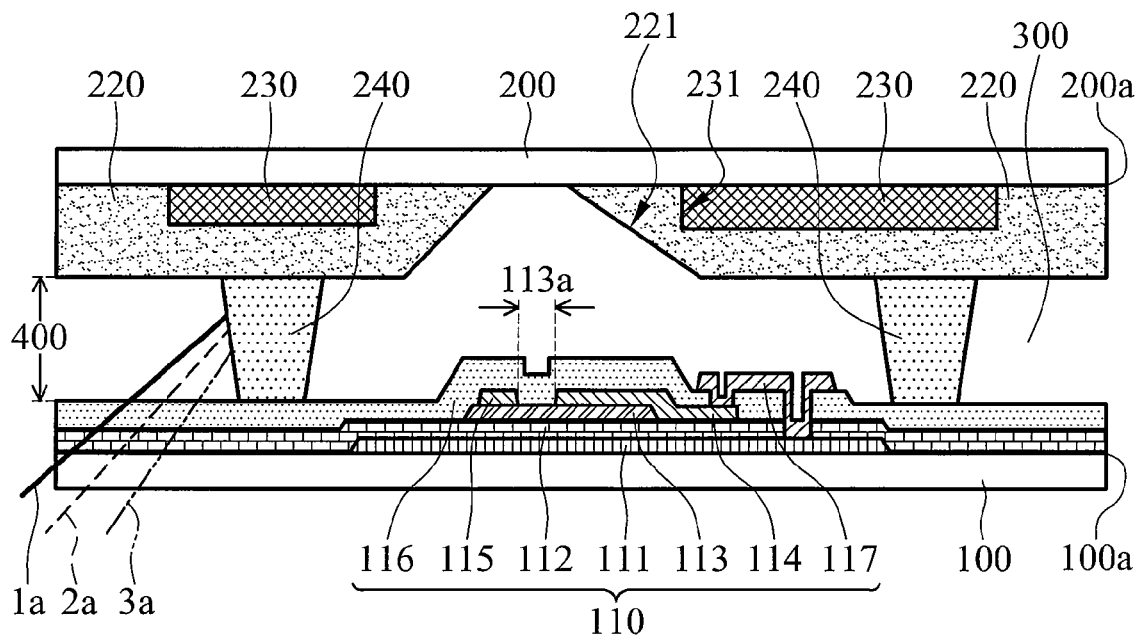
FIGS. 2A and 2B show cross sections of input displays of a first embodiment of the invention.
Figure 2B:
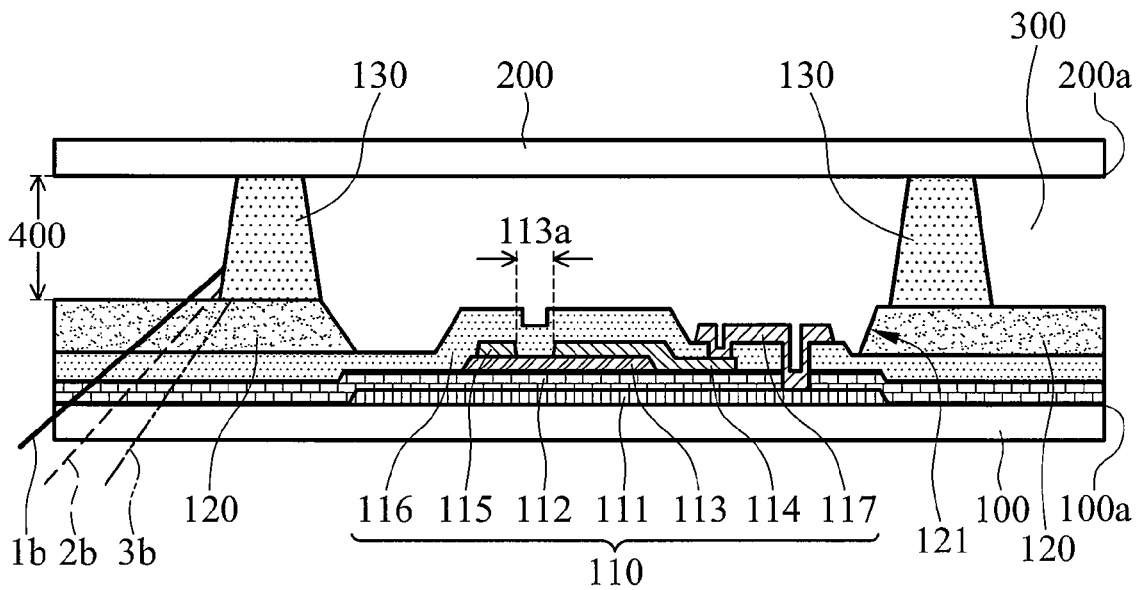

FIGS. 2A and 2B show cross sections of input displays of a first embodiment of the invention. In FIG. 2A, the input display comprises a first substrate 100, a second substrate 200, a liquid crystal layer 300, a photo sensor 110, a color filter 220, and a light-shielding spacer 240.

In FIG. 2A, the first substrate 100 and the second substrate 200 are transparent, such as glass substrates, polymer substrates, or other known rigid or flexible substrates. In this embodiment, the first substrate 100 and the second substrate 200 are glass substrates. The first substrate 100 and the second substrate 200 sandwich the liquid crystal layer 300 in a liquid crystal space 400 therebetween. The liquid crystal space 400 comprises a first substrate side 100a and a second substrate side 200a. In this embodiment, the first substrate side 100a and the second substrate side 200a are opposite surfaces of the first substrate 100 and the second substrate 200. The photo sensor 110 overlies the first substrate side 100a. The color filter 220 is disposed in the liquid crystal space 400 and over the photo sensor 110. The color filter 220 comprises a first opening 221 exposing portions of the photo sensor 110. The light-shielding spacer 240 supports the liquid crystal space 400, and is disposed alongside portions of a periphery of the photo sensor 110.

In FIG. 2A, the color filter 220 is formed overlying the second substrate 200. Thus, the color filter 220 underlies the second substrate side 200a, and the liquid crystal layer 300 is disposed between the color filter 220 and the first substrate 100. In some embodiments, the color filter 220 is selected from one of a group consisting of cyan, magenta, and yellow. In other embodiments, the color filter 220 is selected from one of a group consisting of red, green, and blue. In this embodiment, the light-shielding spacer 240 is disposed between the color filter 220 and the first substrate 100, and serves as a spacer supporting the liquid crystal space 400 between the first substrate 100 and the second substrate 200. After formation of the color filter 220, a black resist can be formed overlying the color filter 220, followed by patterning to form the light shielding spacer 240. The first substrate 100, comprising the photo sensor 110, and the second substrate 200, comprising the color filter 220 and the light shielding spacer 240, are combined, forming the liquid crystal space 400 therebetween, followed by injection of liquid crystal into the liquid crystal space 400, to form liquid crystal layer 300.

The photo sensor 110 may be a thin film transistor or other known photosensitive devices. In this embodiment, the photo sensor 110 is a photosensitive thin film transistor comprising a gate electrode 111, a gate insulator 112, an amorphous silicon layer 113, a source electrode 114, and a drain electrode 115. At least a channel region 113a of the amorphous silicon layer 113 is exposed by the first opening 221 for receiving and detecting ambient light.

The gate electrode 111 is formed overlying the first substrate side 100a, followed by formation of the gate insulator 112 overlying the gate electrode 111 and the first substrate side 100a. An amorphous silicon layer 113 is then formed overlying the gate insulator 112. A conductive layer is then formed overlying the amorphous silicon layer 113 and the gate insulator 112, and patterned to form the source electrode 114 and the drain electrode 115. At least a part of the amorphous silicon layer 113 is exposed to serve as the channel region 113a for detecting light beams, completing the photo sensor 110. Further, a transport passivation layer 116 can be formed overlying the gate insulator 112, the amorphous silicon layer 113, the source electrode 114, and the drain electrode 115, followed by patterning to form openings for connecting to subsequently formed transparent electrodes 117.

In some cases, an optional black matrix 230 may be disposed underlying the second substrate side 200a, between the color filter 220 and the second substrate 200. The black matrix 230 comprises a second opening 231 exposing portions of the photo sensor 110. When the photo sensor 110 is a photosensitive thin film transistor as described, at least the channel region 113a thereof is exposed by the second opening 231 for receiving and detecting ambient light. In FIG. 2A, when the black matrix 230 is formed, the black matrix 230 is above the light shielding spacer 240. The black matrix 230 may comprise metal, such as chromium, or polymer for absorbing received light beams, particularly the light beams from the backlight (not shown) of the input display.

It can be seen that light shielding spacer 240 successfully prevents reflection of representative light beams 1a through 3a, from the backlight to the photo sensor 110, particularly the channel region 113a when the photo sensor 110 is a photosensitive thin film transistor. When the input display is touched, entrance of ambient light is blocked, and reflected backlight no longer interferes with photo sensor 110, thus, input signals are correctly transmitted.

Figure 3:
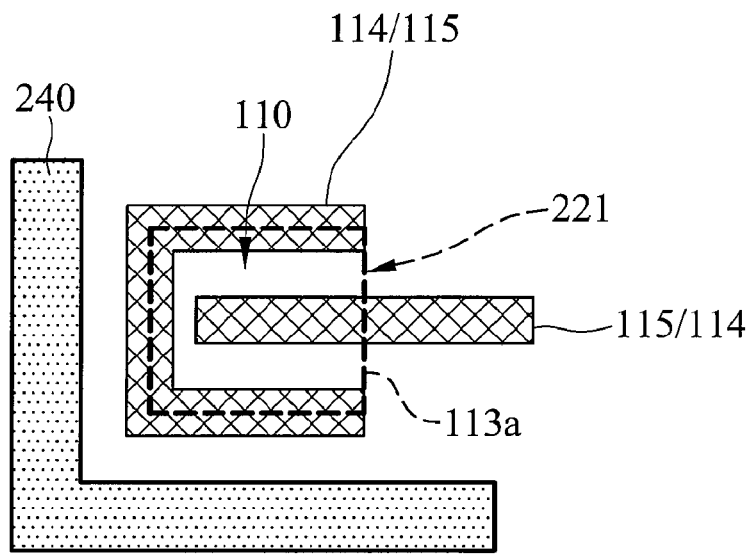
FIG. 3 is a simplified top view of the arrangement of the inventive light-shielding spacer.

In some embodiments, the arrangement of the light shielding spacer 240 depends on the layout of the circuitry on the first substrate side 100a. The conductive layer or metal layer of the circuitry on the first substrate side 100a, such as the source electrode 114 and the drain electrode 115, may assist in blocking reflected backlight. The light shielding spacer 240 is disposed in a region of smaller circuitry distribution. Referring to FIG. 3, which is a simplified local top view of the inventive input display, the light shielding spacer 240 is disposed alongside the periphery of the photo sensor 110, and arranged in an L-shaped region having smaller circuitry distribution, thus the light shielding spacer 240 is L-shaped in this embodiment but can be any shape depending on the shape of the region having smaller circuitry distribution. In some embodiments, the light shielding spacer 240 may be disposed alongside the first opening 221 in any desired shape.

Figure 4:
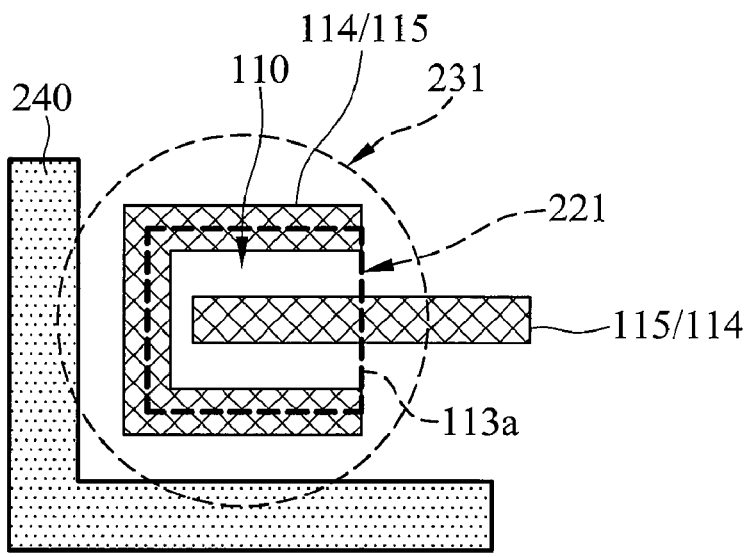
FIG. 4 is a simplified top view of the arrangement of the inventive light-shielding spacer.

FIG. 4 shows a simplified local top view of the inventive input display with optional black matrix 230. The light shielding spacer 240 may cover parts of the second opening 231, but portions of the photo sensor 110, particularly the channel region 113a when the photo sensor 110 is a photosensitive thin film transistor, still remain exposed.

In FIG. 2B, an input display of color filter on array (COA) is shown. The first substrate 100, the second substrate 200, the liquid crystal layer 300, the liquid crystal space 400, the photo sensor 110, and the optional black matrix 230 are the same as those described in FIG. 2A, thus, description thereof is omitted here.

In FIG. 2B, a color filter 120 is disposed on the first substrate side 100a, overlying the first substrate 100, and the liquid crystal layer 300 is between the color filter 120 and the second substrate 200. The color filter 120 comprises an opening 121 exposing portions of the photo sensor 110, particularly the channel region 113a, when the photo sensor 110 is a photosensitive thin film transistor. In some embodiments, the color filter 120 is selected from one of a group consisting of cyan, magenta, and yellow. In other embodiments, the color filter 120 is selected from one of a group consisting of red, green, and blue. After formation of the color filter 120, a black resist layer or other light-shielding layer is formed overlying the color filter 120, followed by patterning to form a light-shielding spacer 130 as shown in FIG. 2B. The light-shielding spacer 130 is disposed between the color filter 120 and the second substrate 200 for supporting the liquid crystal space 400. The arrangement of the light-shielding spacer 130 is similar to that of the described light-shielding spacer 240, thus description thereof is omitted here.

It can be seen that light shielding spacer 130 successfully prevents reflection of representative light beams 1b through 3b, from the backlight to the photo sensor 110, particularly the channel region 113a when the photo sensor 110 is a photosensitive thin film transistor. When the input display is touched, entrance of ambient light is blocked, and reflected backlight no longer interferes with photo sensor 110; thus, input signals are correctly transmitted. The spacer coverage of an LCD display may increase or decrease. In FIGS. 2A and 2B, for example, when the spacer coverage increases, the liquid crystal space 400 becomes more rigid, but the liquid crystal is easy to flow down by gravity so the mura appear at the bottom of the panel. Conversely, when the spacer coverage decreases, but the liquid crystal space 400 tends to collapse the screen which is touched. Thus, these two factors must be considered when determining spacer coverage. In some cases, the formation of the light-shielding spacers 240 and 130 in FIGS. 2A and 2B exhausts the quota of predetermined spacer coverage, potentially affecting spacer layout. Thus, the various approaches to preventing detriment to spacer layout are explored in the following.

Figure 5A:
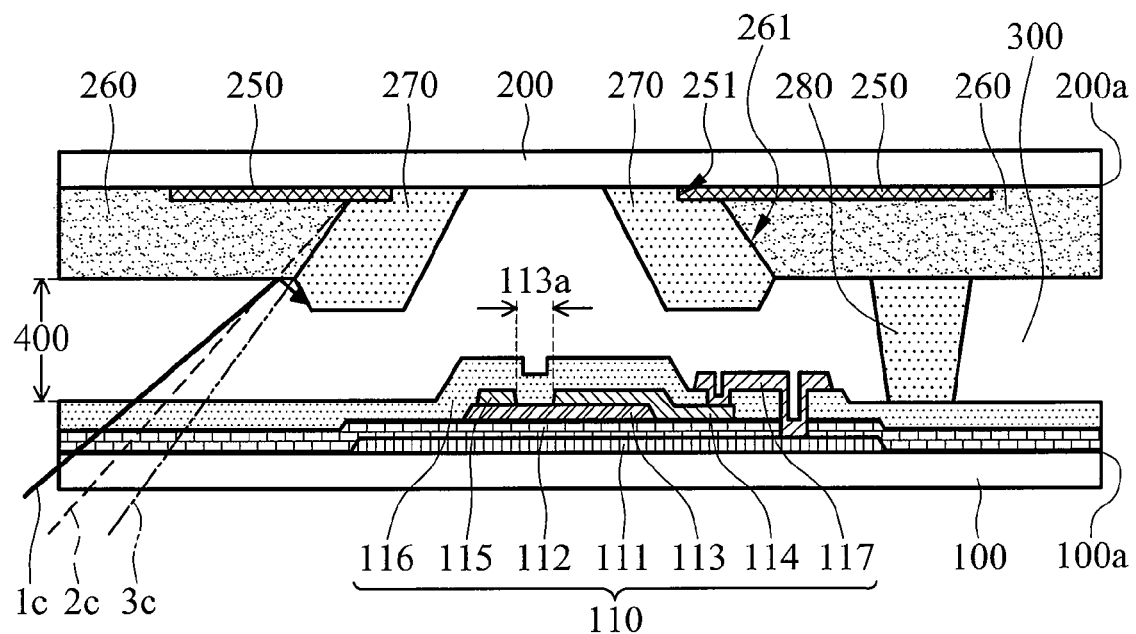
FIGS. 5A and 5B show cross sections of input displays of a second embodiment of the invention.
Figure 5B:
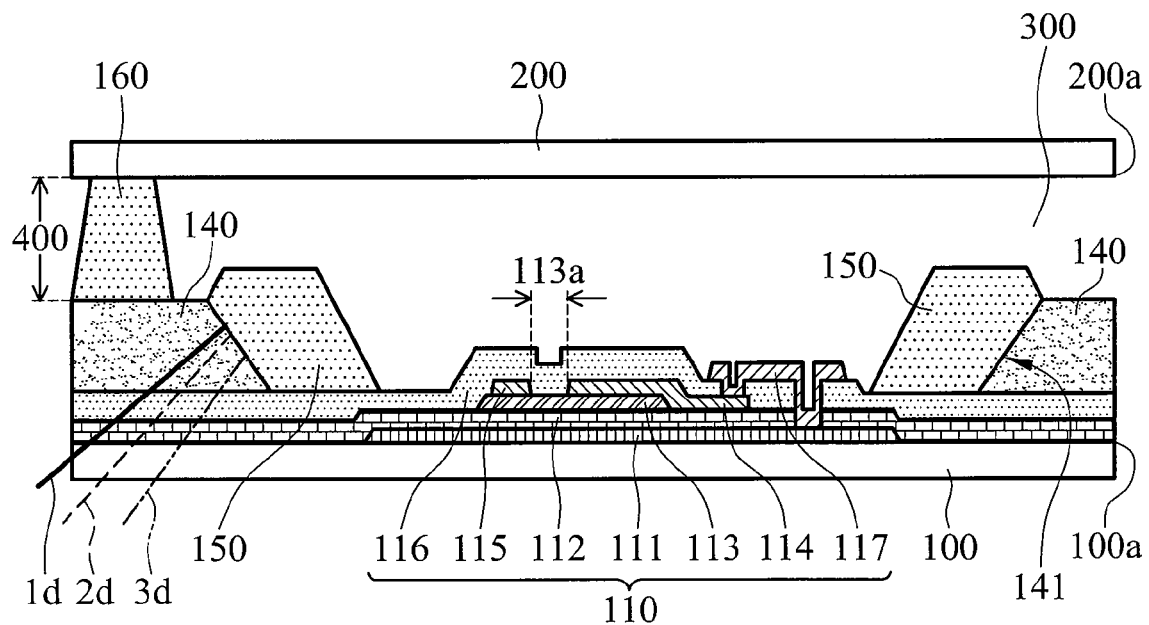

FIGS. 5A and 5B show cross sections of input displays of a second embodiment of the invention. In FIG. 5A, the input display comprises a first substrate 100, a second substrate 200, a liquid crystal layer 300, a photo sensor 110, a color filter 260, and a light-shielding block 270. The first substrate 100, the second substrate 200, the liquid crystal layer 300, the liquid crystal space 400, and the photo sensor 110 are the same as those described in FIG. 2A, thus, further description is omitted here.

In FIG. 5A, the color filter 260 is disposed in the liquid crystal space 400 and over the photo sensor 110. The color filter 260 comprises a first opening 251 exposing at least the channel region 113a. After formation of the color filter 260, the light-shielding block 270 is disposed in the liquid crystal space 400, alongside portions of the photo sensor 110. The channel region 113a is still exposed for receiving ambient light.

In FIG. 5A, the color filter 260 and the light-shielding block 270 underlie the second substrate side 200a, and the liquid crystal layer 300 is between the first substrate 100 and a combination of the color filter 260 and the light-shielding block 270. Thus, the formation of the light-shielding block 270 does not exhaust the quota of predetermined spacer coverage of the input display. A spacer 280 can be disposed in an appropriate region as shown in FIG. 5A. In some cases, the spacer 280 may comprise black resist and serve as a light-shielding spacer as the described light-shielding spacer 240. In this embodiment, the light-shielding block 270 is also disposed alongside portions of the first opening 261. In other embodiments, the light-shielding block 270 can be disposed alongside at least one of the source electrode 114 and the drain electrode 115 as the subsequent third embodiment. The light shielding block 270 may be arranged based on the layout density of the circuitry on the first substrate side 100a as described for the light-shielding spacer 240. For example, the light shielding block 270 is arranged in an L-shaped region of lower circuitry distribution density as shown in FIG. 3.

In this embodiment, the light-shielding block 270 comprises black photo resist and is formed by patterning a black photo resist layer overlying the color filter 260 and the second substrate 200. In other embodiments, the color of the color filter 260 may be selected from one of a first group consisting of red, green, and blue, and the light-shielding block 270 may comprise another color filter of at least one different color from the color filter 260. The light-shielding block 270 preferably comprises another color filter of at least one different color selected from the first group. For example, when the color filter 260 is red, the light-shielding block 270 comprises at least a blue or green color filter, and may optionally comprise color filters of other colors. Thus, formation of the light-shielding block 270 can be integrated with formation of the color filters for the input display, simplifying the fabrication process and reducing production costs. In other embodiments, the color of the color filter 260 may be selected from one of a second group consisting of cyan, magenta, and yellow, and the light-shielding block 270 may comprise another color filter of a color different than the color of color filter 260. The light-shielding block 270 preferably comprises another color filter of at least one different color selected from the second group. For example, when the color filter 260 is cyan, the light-shielding block 270 comprises at least a magenta, or yellow color filter, and may optionally comprise color filters of other colors. Thus, formation of the light-shielding block 270 can be integrated with formation of the color filters for the input display, simplifying fabrication and reducing production costs.

In some cases, an optional black matrix 250 may be disposed underlying the second substrate side 200a, between the second substrate 200 and the combined color filter 260 and light-shielding block 270. The black matrix 250 comprises a second opening 251 exposing portions of the photo sensor 110, such as the channel region 113a for receiving and detecting ambient light. The black matrix 250 may comprise metal, such as chromium, or polymer for absorbing received light beams, particularly the light beams from the backlight (not shown) of the input display.

It can be seen that light shielding block 270 successfully prevents reflection of representative light beams 1c through 3c, from the backlight, to the photo sensor 110, particularly the channel region 113a when the photo sensor 110 is a photosensitive thin film transistor. When the input display is touched, blocking entrance of ambient light, the reflected light from the backlight no longer interferes with photo sensor 110, thus, input signals are correctly transmitted.

FIG. 5B shows a color filter on array (COA) input display. The first substrate 100, the second substrate 200, the liquid crystal layer 300, the liquid crystal space 400, the photo sensor 110, and the optional black matrix 250 are the same as those described in FIG. 5A, thus, description thereof is are omitted here.

In FIG. 5B, a color filter 140 and a light-shielding block 150 are disposed on the first substrate side 100a, overlying the first substrate 100, and the liquid crystal layer 300 is between the second substrate 200 and the combined color filter 140 and light-shielding block 150. The color filter 140 comprises an opening 141 exposing portions of the photo sensor 110, particularly the channel region 113a when the photo sensor 110 is a photosensitive thin film transistor. After formation of the color filter 140, the light-shielding block 150 is disposed in the liquid crystal space 400, alongside portions of the photo sensor 110. The channel region 113a is still exposed for receiving ambient light. The color of the color filter 140 and materials of the light-shielding block 150 are similar to that of color filter 260 and light-shielding block 270, thus, description thereof is omitted here.

In FIG. 5B, the color filter 140 and the light-shielding block 150 overlie the first substrate side 100a, and the liquid crystal layer 300 is between the second substrate 200 and the combined color filter 140 and light-shielding block 150. Thus, formation of the light-shielding block 150 does not exhaust the quota of predetermined spacer coverage of the input display. A spacer 160 can be disposed in an appropriate region as shown in FIG. 5B. In some cases, the spacer 160 may comprise black resist and serve as the described light-shielding spacer 130. In this embodiment, the light-shielding block 150 is also disposed alongside portions of the first opening 141. In other embodiments, the light-shielding block 150 can be disposed alongside at least the source electrode 114 or the drain electrode 115 as in the third embodiment described later in this disclosure. The light shielding spacer may be arranged based on the layout density of the circuitry on the first substrate side 100a as described for the light-shielding block 150. For example, the light shielding spacer is arranged in an L-shaped region of lower circuitry distribution density as the light-shielding block 150 shown in FIG. 3.

It can be seen that the light shielding block 150 successfully prevents reflection of representative light beams 1d through 3d, from backlight, to photo sensor 110, particularly the channel region 113a when the photo sensor 110 is a photosensitive thin film transistor. When the input display is touched, blocking entrance of ambient light, the reflected backlight no longer interferes with photo sensor 110, thus, input signals can be correctly transmitted.

Figure 6A:
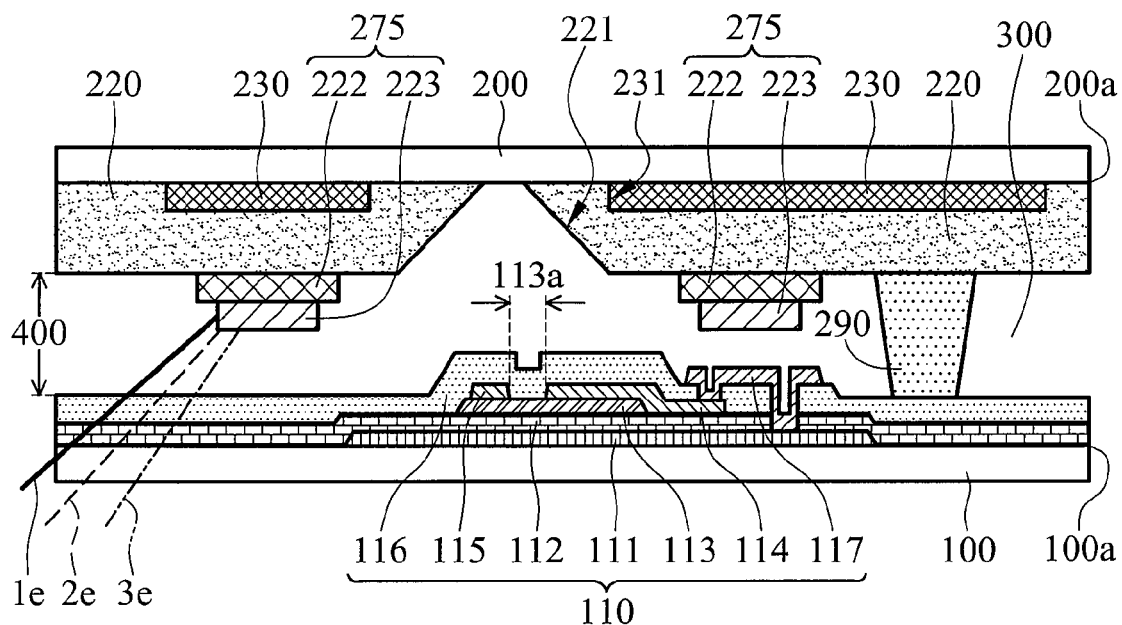
FIGS. 6A and 6B show cross sections of input displays of a third embodiment of the invention.
Figure 6B:
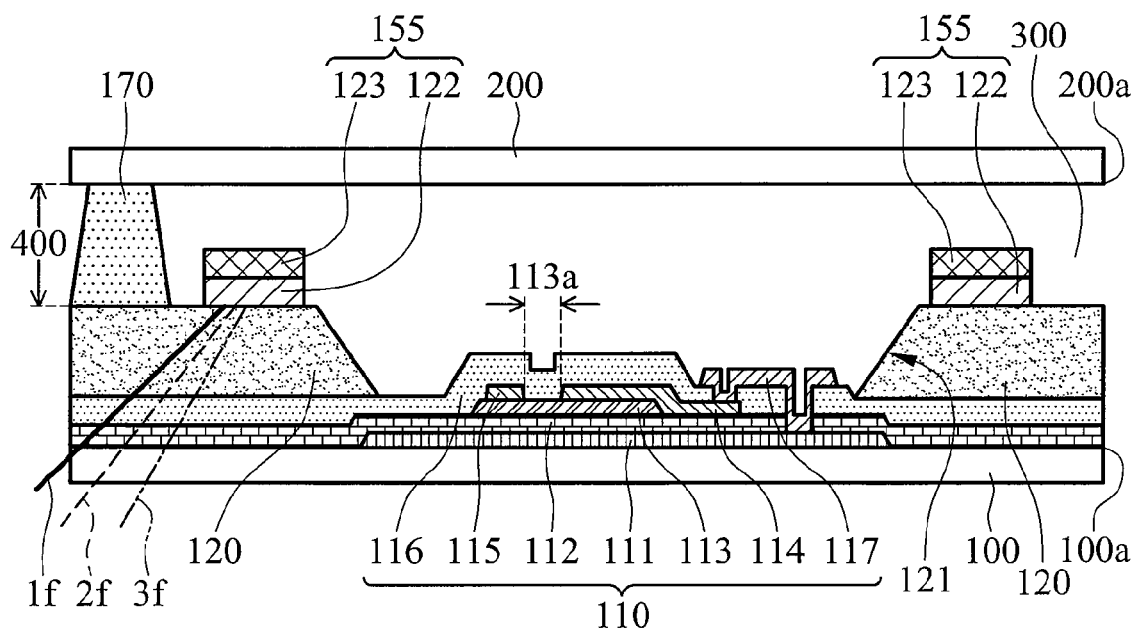

FIGS. 6A and 6B show cross sections of input displays of a third embodiment of the invention. In FIG. 6A, the input display comprises a first substrate 100, a second substrate 200, a liquid crystal layer 300, a photo sensor 110, a color filter 220, and a light-shielding block 275. The first substrate 100, the second substrate 200, the liquid crystal layer 300, the liquid crystal space 400, the photo sensor 110, and the color filter 220 are the same as those described in FIG. 2A, thus, description thereof is omitted here.

In FIG. 6A, the light-shielding block 275 is disposed in the liquid crystal space 400, alongside portions of the photo sensor 110 after formation of the color filter 220. The channel region 113a is still exposed for receiving ambient light.

In FIG. 6A, the color filter 220 and the light-shielding block 275 underlie the second substrate side 200a, and the liquid crystal layer 300 is between the first substrate 100 and a combination of the color filter 220 and the light-shielding block 275. Thus, the formation of the light-shielding block 275 does not exhaust the quota of predetermined spacer coverage of the input display. A spacer 290 can be disposed in an appropriate region as shown in FIG. 6A. In this embodiment, the light-shielding block 275 is disposed alongside at least one of the source electrode 114 and the drain electrode 115. The light shielding block 275 may be arranged based on the layout density of the circuitry on the first substrate side 100a as described for the light-shielding block 150. For example, the light-shielding block 275 is arranged in an L-shaped region of lower circuitry distribution density as the light-shielding block 150 shown in FIG. 3.

In this embodiment, the color of the color filter 220 may be selected from one of a first group consisting of red, green, and blue, and the light-shielding block 275 may comprise another color filter of at least one different color from the color filter 220, such as color filters 222 and 223 as shown in FIG. 6A. The light-shielding block 275 preferably comprises another color filter of at least one different color selected from the first group. For example, when the color filter 260 is red, the color filters 222 and 223 are respective green and blue, and the light-shielding block 275 may optionally comprise color filters of other colors. Thus, formation of the light-shielding block 275 can be integrated with formation of the color filters for the input display, simplifying fabrication and reducing production costs. In other embodiments, the color of the color filter 220 may be selected from one of a second group consisting of cyan, magenta, and yellow, and the light-shielding block 275 may comprise another color filter of a color different than the color of color filter 220. The light-shielding block 275 preferably comprises another color filter of at least one different color selected from the second group. For example, when the color filter 220 is cyan, the color filters 222 and 223 are respectively magenta and yellow, and the light-shielding block 275 may optionally comprise color filters of other colors. Thus, formation of the light-shielding block 275 can be integrated with formation of the color filters for the input display, simplifying fabrication and reducing production costs. In another alternative embodiment, the light-shielding block 275 may be replaced by a black resist block, similar with the described light-shielding block 270.

It can be seen that the light shielding spacer 275 successfully prevents reflection of representative light beams 1e through 3e, from backlight, to photo sensor 110, particularly the channel region 113a when the photo sensor 110 is a photosensitive thin film transistor. When the input display is touched, blocking entrance of ambient light, the reflected backlight no longer interferes with photo sensor 110; thus, input signals are correctly transmitted. FIG. 6B shows a color filter on array (COA) input display. The first substrate 100, the second substrate 200, the liquid crystal layer 300, the liquid crystal space 400, the photo sensor 110, and the optional black matrix 230 are the same as those described in FIG. 5A, thus, description thereof is omitted here. The first substrate 100, the second substrate 200, the liquid crystal layer 300, the liquid crystal space 400, the photo sensor 110, and the optional black matrix 230 are the same as those described in FIG. 5A, thus, description thereof is omitted here. In FIG. 6B, a color filter 120 and a light-shielding block 155 are disposed on the first substrate side 100a, overlying the first substrate 100, and the liquid crystal layer 300 is between the second substrate 200 and a combination of the color filter 120 and the light-shielding block 155. The color filter 120 comprises an opening 121 exposing portions of the photo sensor 110, particularly the channel region 113a when the photo sensor 110 is a photosensitive thin film transistor. After formation of the color filter 120, the light-shielding block 155 is disposed in the liquid crystal space 400, alongside portions of the periphery of the photo sensor 110. The channel region 113a is still exposed for receiving ambient light. In this embodiment, the light-shielding block 155 comprises color filters 122 and 123. The color relationship between the color filter 120 and the light-shielding block 155 are respectively similar to that of color filter 220 and the light-shielding block 275 shown in FIG. 6A, thus, description thereof is are omitted here. In some embodiment, the light-shielding block 155 may be replaced by a black resist block, similar with the described light-shielding block 150.

In FIG. 6B, the color filter 120 and the light-shielding block 155 overlie the first substrate side 100a, and the liquid crystal layer 300 is between the second substrate 200 and the combined color filter 120 and the light-shielding block 155 in FIG. 5B. Thus, the formation of the light-shielding block 155 does not exhaust the quota of predetermined spacer coverage of the input display. A spacer 170 can be disposed in an appropriate region as shown in FIG. 6B. In some cases, the spacer 170 may comprise black resist and serve as a light-shielding spacer as the described light-shielding spacer 130 in FIG. 2B. In this embodiment, the light-shielding block 155 is disposed alongside at least one of the source electrode 114 and the drain electrode 115. The light shielding block 155 may be arranged based on the layout density of the circuitry on the first substrate side 100a as described for the light-shielding spacer 240. For example, the light-shielding block 155 is arranged in an L-shaped region of lower circuitry distribution density as shown in FIG. 3. It can be seen that the light shielding block 155 successfully prevents reflection of representative light beams if through 3f, from backlight, to photo sensor 110, particularly the channel region 113a when the photo sensor 110 is a photosensitive thin film transistor.

When the input display is touched, entrance of ambient light is blocked, and reflected backlight no longer interferes with photo sensor 110, thus, input signals are correctly transmitted. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An input display, comprising:
   a first substrate and a second substrate sandwiching a liquid crystal layer;
   a photo sensor disposed on the first substrate;
   a color filter having a first opening exposing a first portion of the photo sensor; and
   a light-shielding spacer arranged alongside the photo sensor and directly disposed on the color filter.

2. The input display as claimed in claim 1, further comprising a black matrix having a second opening exposing the first portion.

3. The input display as claimed in claim 2, wherein the black matrix is disposed in the color filter.

4. The input display as claimed in claim 2, wherein the black matrix comprises metal or polymer.

5. The input display as claimed in claim 2, wherein the light-shielding spacer covers parts of the second opening.

6. The input display as claimed in claim 1, wherein the light-shielding spacer comprises black resist.

7. The input display as claimed in claim 1, wherein the light-shielding spacer is disposed between the color filter and the first substrate.

8. The input display as claimed in claim 1, wherein the light-shielding spacer is an L-shaped element as viewed from a top view.

9. The input display as claimed in claim 1, further comprising a light-shielding block disposed on the color filter.

10. The input display as claimed in claim 9, wherein the light-shielding block comprises a first color different from a second color of the color filter.

11. The input display as claimed in claim 10, wherein the first color is selected from a group consisting of red, green, blue, cyan, magenta, yellow, and black.

12. The input display as claimed in claim 10, wherein the second color is selected from a group consisting of red, green, blue, cyan, magenta, and yellow.

13. The input display as claimed in claim 9, wherein the black matrix is disposed in the light-shielding block.

14. The input display as claimed in claim 1, wherein the first portion is an amorphous silicon channel region.

15. The input display as claimed in claim 1, wherein the photo sensor is a photosensitive thin film transistor.

16. The input display as claimed in claim 1, wherein the photo sensor comprises a source electrode and a drain electrode.

17. The input display as claimed in claim 16, wherein the light-shielding spacer is disposed alongside a second portion of the source electrode.

18. The input display as claimed in claim 16, wherein the light-shielding spacer is disposed alongside a third portion of the drain electrode.

19. The input display as claimed in claim 1, wherein the color filter is disposed on the first substrate.

20. The input display as claimed in claim 19, wherein the light-shielding spacer is disposed between the color filter and the second substrate.

* * * * *